United States Patent
Nishiyama et al.

(10) Patent No.: US 7,777,452 B2
(45) Date of Patent: Aug. 17, 2010

(54) LITHIUM ION SECONDARY BATTERY SYSTEM, AND METHOD FOR OPERATING LITHIUM ION SECONDARY BATTERY

(75) Inventors: Junko Nishiyama, Tokyo (JP); Chika Kanbe, Tokyo (JP)

(73) Assignee: NEC Corporation, Tokyo (JP)

( * ) Notice: Subject to any disclaimer, the term of this patent is extended or adjusted under 35 U.S.C. 154(b) by 1124 days.

(21) Appl. No.: 10/528,042

(22) PCT Filed: Nov. 14, 2003

(86) PCT No.: PCT/JP03/14508

§ 371 (c)(1),
(2), (4) Date: Mar. 17, 2005

(87) PCT Pub. No.: WO2004/047214

PCT Pub. Date: Jun. 3, 2004

(65) Prior Publication Data

US 2005/0266299 A1    Dec. 1, 2005

(30) Foreign Application Priority Data

Nov. 19, 2002    (JP) ............................ 2002-334954

(51) Int. Cl.
H02J 7/00    (2006.01)
H02J 7/04    (2006.01)
(52) U.S. Cl. ...................................... 320/129; 320/139
(58) Field of Classification Search ................. 320/129, 320/135, 136, 139
See application file for complete search history.

(56) References Cited

U.S. PATENT DOCUMENTS 6,366,056 B1 *    4/2002    Podrazhansky et al. ..... 320/141
6,836,098 B1 *    12/2004    O'Brien ....................... 320/166

FOREIGN PATENT DOCUMENTS

JP    64-077432 A    3/1989

(Continued)

OTHER PUBLICATIONS

So Ota et al., "Synthesis of 5V-class cathode active material by composite carbonate process and its properties for lithium secondary batteries", Abstracts of the 41$^{st}$ Battery Symposium, Nov. 20, 2000, pp. 452-453.

(Continued)

*Primary Examiner*—Edward Tso
*Assistant Examiner*—Richard V Muralidar
(74) *Attorney, Agent, or Firm*—Sughrue Mion, PLLC (57) ABSTRACT

A drop of discharge or charge capacity in discharging or charging with a large current is reduced without changing a design of a lithium ion secondary battery itself. When the lithium ion secondary battery for a car or a vehicles such as an electric automobile and a hybrid automobile is discharged or charged with, for instance, a large current not less than 5C, an intermittent power feeding of repeatedly executing a power feeding (t2) and a pause (t1) is carried out.

18 Claims, 4 Drawing Sheets

FOREIGN PATENT DOCUMENTS

| | | |
|---|---|---|
| JP | 5-176469 A | 7/1993 |
| JP | 06-036803 A | 2/1994 |
| JP | 9-233726 A | 9/1997 |
| JP | 11-204148 A | 7/1999 |
| JP | 2000-030749 A | 1/2000 |
| JP | 2002-260673 A | 9/2002 |
| JP | 2003-217679 A | 7/2003 |

OTHER PUBLICATIONS

Atsushi Ueda et al., "Development of Li-Mn-Me-O Compounds for High Voltage Li Ion Batteries", Abstracts of the 41$^{st}$ Battery Symposium, Nov. 20, 2000, pp. 450-451.

Atsushi Mori et al., "Synthesis and Battery Performance of 5V-class $LiNi_{0.5}Mn_{1.5}O_4$ Prepared by Self-Reaction Method", Abstracts of the 41$^{st}$ Battery Symposium, Nov. 20, 2000, pp. 456-457.

* cited by examiner

LITHIUM ION SECONDARY BATTERY SYSTEM, AND METHOD FOR OPERATING LITHIUM ION SECONDARY BATTERY

BACKGROUND OF THE INVENTION

1. Field of the Invention

The present invention relates to a lithium ion secondary battery system and a method for operating the lithium ion secondary battery system.

2. Description of the Prior Art

In recent years, with growing environmental problem concerns, developments of an electric automobile or a hybrid automobile are actively carried out. Accompanied with this, developments of a medium power battery of about 100 W to 1000 W used for the electric automobile or the hybrid automobile or the like, or a high power battery to be not less than 1000 W are advanced. As a battery for the automobile, although a large-sized battery by combining a large amount of the lead-acid batteries or the nickel-hydrogen batteries is mainly utilized, such battery has the problem that energy density per weight is low, and energy density per volume is low. For that reason, it is desired that the lithium ion secondly battery, which shows more excellent characteristics in an output or a heating or the like, may be made to apply to such automobile.

Conventionally, in the lithium ion secondary battery using the metallic lithium for a negative electrode, when carrying out quickly charging, lithium is extracted as dendrite to be crystalline state of acicular and/or dendritic, with the result that there is the problem of bringing about short circuit between the positive electrode and the negative electrode. In order to solve such the problem, there is disclosed the technique capable of repeatedly charging without producing charging failure while preventing growth of dendrite, upon charging with pulse current manner of repeatedly executing power feeding and pausing (Patent Literature 1).

On the other hand, in order to solve such the problem caused by the dendrite growth, the lithium secondary battery, which uses carbon material for a negative electrode, has been developed. However, in such a lithium ion secondary battery, there is the problem of occurring capacity loss at an initial charging caused by irreversibility of the carbon material. In order to solve such the problem, there is disclosed a technique to improve battery capacity, upon causing the battery to overcharge with small current at the time of initial charging (Patent Literature 2).

Further, conventionally, even though when the charge-discharge current of the lithium type rechargeable battery is small, in order to prevent disappearance of a passivation film formed in the vicinity of a lithium positive electrode, there is disclosed a technique, which intermittently uses the current (for instance, not less than C/2, when nominal capacity of the battery is taken to as C) larger than necessary charge-discharge current (Patent Literature 3).

Patent Literature 1: Japanese Laid-Open Patent Publication No. H06-36803
Patent Literature 2: Japanese Patent No. 2949705
Patent Literature 3: Japanese Laid-Open Patent Publication No. S64-77432
Patent Literature 4: Japanese Laid-Open Patent Publication No. 2002-260673 (TABLE 3, Comparison example 3)

SUMMARY OF THE INVENTION

Meanwhile, at present, the capacity of the lithium ion secondary battery is at most to be degree of 130 mAh/g, even though some devices are made to apply to electrode material. However, in cases where the lithium ion secondary battery is made to apply to cars or vehicles such as automobiles or motorcycles or the like, the cars necessitate charging and discharging with a large current not less than 10 A at the time of acceleration or at the time of deceleration. In order to obtain large current without changing design of the lithium ion secondary battery itself, for instance, it is conceivable that the lithium ion secondary battery is made to charge and discharge with high current value with respect to its nominal capacity. However, in the conventional lithium ion secondary battery, there is the problem that dischargeable real capacity becomes small with increasing current value to the nominal capacity of the battery. For instance, as shown in the Japanese Laid-Open Patent Publication No. 2002-260673, in the conventional lithium ion secondary battery, when discharge rate is taken to as 3 C, the discharge capacity is substantially lowered. When current value is made to increase and continuous power feeding time is made to lengthen, influence of diffusion resistance of the lithium ion becomes large, with the result that moving speed of the lithium ion decreases. Therefore, the IR drop increases such that the voltage exceeds an upper limit voltage of the battery (an open circuit voltage) or a lower limit voltage (an end-of-discharge voltage) to cause the above problem.

The object of the present invention is to provide a technique to reduce a drop of discharge or charge capacity in discharging or charging with a large current without changing the design of a lithium ion secondary battery itself.

According to the present invention, there is provided a method for operating a lithium ion secondary battery system comprising: carrying out an intermittent power feeding in which a power feeding and a pause are repeatedly executed, when a lithium ion secondary battery is discharged or charged with not less than a predetermined discharge rate or charge rate.

Here, it is also possible to judge whether or not the discharge rate or the charge rate is not less than the predetermined discharge rate or the charge rate based on the current value. The lithium ion secondary battery of the present invention is capable of being applied to an apparatus such as an automobile or the like, which requires the discharging or the charging with a large current. According to the present invention, even though when the lithium ion secondary battery is discharged or charged with a large current, an intermittent power feeding is carried out, therefore, it is possible to reduce influence of diffusion resistance of the lithium ion, and to diffuse the lithium ion uniformly. As a result, the movement of the lithium ion is enhanced, therefore, it is possible to suppress decrease of an effective capacity of the lithium ion secondary battery. Owing to this, it is possible to suitably carrying out the discharging or the charging with a large current without changing the design of the lithium ion secondary battery.

In the present invention, it is possible to carry out such the intermittent power feeding at the time of normal operation of the lithium ion secondary battery. Here, the time of normal operation means the time when charging or discharging to a load or a battery charger is actually executed, not limited to an initial charging.

In the method for operating the lithium ion secondary battery system of the present invention, the pause may be executed for a period not less than the period required for the voltage of the lithium ion secondary battery to restore not less than 70% of the open circuit voltage after the lithium ion secondary battery is discharged until the voltage thereof reaches the discharge end voltage, when the lithium ion secondary battery is discharged.

Figure 3:
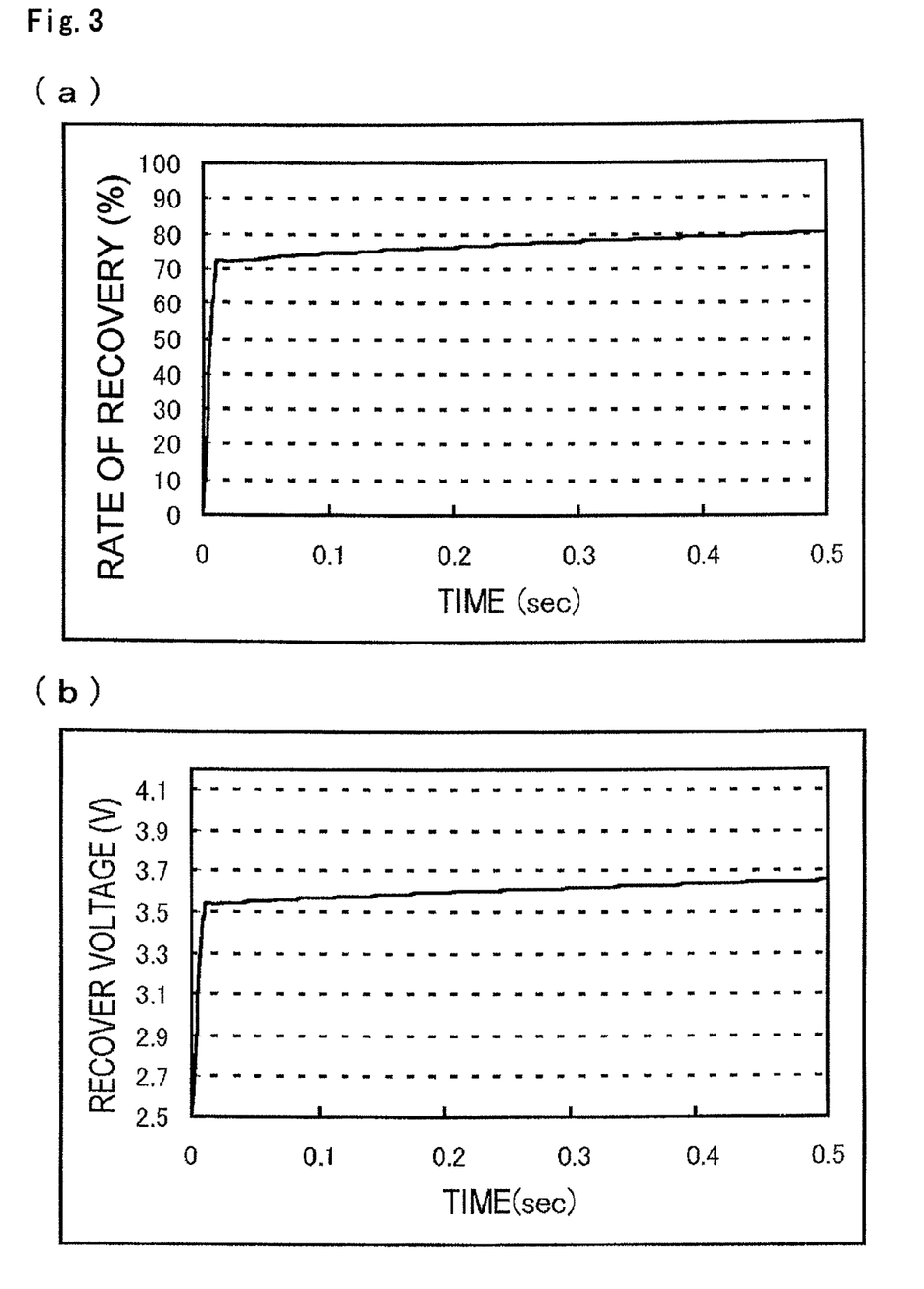
FIG. 3 is a view showing a recovery state of the voltage, after discharging the lithium ion secondary battery.

Although a lower limit of the pausing time is not particularly limited, after discharging the lithium ion secondary battery until the voltage thereof reaches the end voltage, the pause can be executed during the time period required for the voltage to restore up to not less than 70% of the open circuit voltage. By executing the pause for such the period, the state of the lithium ion becomes a homogeneous equilibrium from a heterogeneous state, therefore, it is possible to suppress decrease of effective capacity of the lithium ion secondary battery. As will be described later, with referring to FIG. 3, when stopping the power feeding, after carrying out the discharging, voltage is restored quickly. The pausing period can be set to, for instance, not less than 0.001 sec. Further, although an upper limit of the pausing time is not particularly limited, the upper limit of the pausing time can be set to a period at which influences on operation of an apparatus, which is mounted with the lithium ion secondary battery do not occur, for instance, not more than 10 sec. Owing to this, it is possible to increase substantially effective capacity without affecting on operation of the apparatus.

In the method for operating the lithium ion secondary battery system of the present invention, said pause may be executed for a period not less than the period required for the voltage of the lithium ion secondary battery to go down by not less than 70% of a voltage difference between the open circuit voltage and the charge end voltage after the lithium secondary battery is charged until the voltage thereof reaches the charge end voltage, when the lithium ion secondary battery is charged.

Here, the charge end voltage is an end voltage where the lithium ion secondary battery is charged. When the lithium ion secondary battery is charged with a large current, movement of the lithium ion is inhibited because of influence of diffusion resistance of the lithium ion, so that, the charge end voltage becomes not less than the open circuit voltage. Also in such a case, by stopping power feeding, the state of lithium ion is changed to a homogeneous equilibrium from a heterogeneous state, therefore, it is possible to have the voltage of the lithium ion secondary battery near to the open circuit voltage.

In the method for operating the lithium ion secondary battery system of the present invention, it is possible to execute the power feeding and the pause repeatedly with constant time intervals.

In the method for the lithium ion secondary battery system of the present invention, said intermittent power feeding may be carried out when the discharge rate or the charge rate is not less than 5 C.

Here, a charge (discharge) rate for having the lithium ion secondary battery in a fully charged state into a perfectly discharged state in one hour is assumed to be 1 C. When the lithium ion secondary battery is discharged or charged with a large current, the above described influence of the diffusion resistance of the lithium ion can be a problem, however, according to the present invention, since a heterogeneous state of lithium ions can be eliminated by executing the intermittent power feeding, the decrease of effective capacity of the lithium ion secondary battery can be restrained, thus, it is possible to suppress decrease of the effective capacity of the lithium ion secondary battery.

In the method for operating the lithium ion secondary battery system of the present invention, the lithium ion secondary battery may include a positive active material having an average discharge potential to the lithium metal of not less than 4.5V. Further, in the method for the lithium ion secondary battery system of the present invention, the lithium ion secondary battery may include a positive active material constituted with a 4V class or a 5V class of a spinel type lithium manganese composite oxide. Further, the lithium ion secondary battery may include a negative active material constituted by a carbon material such as natural graphite, artificial graphite or the like as the main ingredient.

In the method for operating the lithium ion secondary battery system of the present invention, the lithium ion secondary battery may be incorporated in a power supply device of an electric automobile or a hybrid automobile.

According to the present invention, there is provided a lithium ion secondary battery system comprising: a lithium ion secondary battery; and a control unit which carries out an intermittent power feeding in which a power feeding and a pause are repeatedly executed, when a lithium ion secondary battery is discharged or charged with not less than a predetermined discharge rate or charge rate.

In the lithium ion secondary battery system of the present invention, said control unit may execute said pause for a period not less than the period required for the voltage of the lithium ion secondary battery to restore up to not less than 70% of the open circuit voltage after the lithium ion secondary battery is discharged until the voltage thereof reaches the discharge end voltage, when the lithium ion secondary battery is discharged.

The lithium ion secondary battery system of the present invention may further comprise a voltage measuring unit which measures a voltage of the lithium ion secondary battery, wherein said control unit may execute said pause for a period not less than the period required for the voltage of the lithium ion secondary battery to go down by not less than 70% of a voltage difference between the open circuit voltage and the charge end voltage after the lithium secondary battery is charged until the voltage thereof reaches the charge end voltage, when the lithium ion secondary battery is charged.

The lithium ion secondary battery system of the present invention may further comprise a detection unit which detects the discharge rate or the charge rate of the lithium ion secondary battery, wherein said control unit may carry out said intermittent power feeding when the discharge rate or the charge rate of the lithium ion secondary battery is not less than 5 C.

In the lithium ion secondary battery system of the present invention, the lithium ion secondary battery may include a positive active material having an average discharge potential to the lithium metal of not less than 4.5V. Further, in the lithium ion secondary battery system of the present invention, the lithium ion secondary battery may include a positive active material constituted with a 4V class or a 5V class of a spinel type lithium manganese composite oxide. Further, the lithium ion secondary battery may include a negative active material constituted with a carbon material such as natural graphite, artificial graphite or the like as the main ingredient.

In the lithium ion secondary battery system of the present invention, the lithium ion secondary battery may be incorporated in a power supply device of an electric automobile or a hybrid automobile.

BRIEF DESCRIPTION OF DRAWINGS

The above and other objects, features and advantages will be more apparent from the following preferred embodiment and the accompanying drawings.

DETAILED DESCRIPTION OF THE INVENTION

The lithium ion secondary battery described in the following embodiment is capable of being used in such a way as to be appropriately incorporated in a power supply device for an apparatus requiring relatively large current, such as an electric automobile or a hybrid automobile or the like.

The secondary battery of the present invention has a positive electrode with lithium containing metal composite oxide as a positive active material and a negative electrode having a negative active material capable of occluding and releasing lithium. There is provided a separator between the above positive electrode and negative electrode so as not to form an electrical contact therebetween. Further, the above positive electrode and the negative electrode are in a state where both are dipped in the electrolyte having lithium ion conductivity, and these are in a state where the electrodes in the electrolyte are sealed in a battery case. A secondary battery system of the present invention is a battery pack in which a plurality of the secondary batteries constituted as above are connected in series.

In the secondary battery of the present embodiment, a positive electrode material of 4V class or a positive electrode material of 5V class (material having the average discharge potential not less than 4.5V to the lithium metal) is used as the positive active material.

As for the positive electrode material of 4V class, it is possible to use lithium containing metal oxides, such as, for instance, $LiCoO_2$, $LiNiO_2$, $LiMn_2O_4$ or the like. Among them, a spinel type lithium-manganese composite oxide represented by $LiMn_2O_4$ is preferably used. In cases where $LiMn_2O_4$ is used, it is also possible to replace trivalent Mn with another element. For instance, it is possible to use a lithium-manganese composite oxide represented by a composition formula $LiM_xMn_{2-x}O_4$ (M expresses not less than one kind selected from Al, B, Cr, Co, Ni, Ti, Fe, Mg, Ba, Zn, Ge, and Nb, $0.01 \leq x \leq 1$). Because of this, it is possible to improve structural stability.

As for the positive electrode material of 5V class, lithium containing composite oxide is suitably used, for instance. As for the lithium containing composite oxide, the spinel type lithium-manganese composite oxide represented by $LiMn_{1-x}M_xO_4$ ($0 \leq x < 1$, M=Ni, Co, Cr, Cu, or Fe), olivine type lithium containing composite oxide represented by $LiMPO_4$ (M=Co, Ni or Fe), and inverse spinel type lithium containing composite oxide such as $LiNiVO_4$ or the like are exemplified.

Among the above positive active materials, it is preferable to use $LiNi_xMn_{2-x}O_4$ which is a spinel type lithium-manganese composite oxide having a stable crystal structure, and from which high capacity of not less than 130 mAh/g is obtained. A composition ratio x of Ni in this active material is set to a range of 0.4 to 0.6. In such a way as above, it is possible to improve energy density, while sufficiently ensuring discharge region at not less than 4.5V.

Further, as for the positive active material, a material in which a part of Mn in $LiNi_xMn_{2-x}O_4$ is made to replace with Li, Al, Mg, Ti, Si or Ge is used, so that the cycle characteristic is further improved. Upon replacing a part of Mn with the above element, the crystal structure of the active material is further stabilized. For this reason, since decomposition of electrolyte is suppressed, generated amount of decomposition product of electrolyte decreases. Consequently, it is estimated that deposition of the decomposition product of the electrolyte to the negative electrode is reduced.

Further, in the active material obtained in such a way that a part of O within the above active material is made to replace with F or Cl or the like, crystal structure is still further stabilized, so that more preferable cycle characteristics is obtained. In addition, in a system where a part of Mn is replaced with monovalent to trivalent elements such as Li, Al, and Mg, as the Ni valence is increased, the capacity is lowered as the displacement amount increases. Replacement of oxygen with halogen such as fluorine, and chlorine cancels the increase of Ni valence, therefore, it has an additional merit to keep high capacity.

As for the negative active material, although it is possible to use various carbon materials such as natural graphite, artificial graphite or the like as a main ingredient, among them, it is preferable that amorphous carbon is taken to as a main ingredient. In such a way as above, it is possible to reduce deposition of the decomposition product of the electrolyte on the surface of the negative electrode, so that it is possible to contribute to cycle characteristic improvement. Here, the amorphous carbon in the present invention is the carbon material with a broad scattering band having a peak within a range of 15 to 40 degree in a $2\theta$ value of X-ray diffraction method using CuK a ray.

In addition, it may be suitable that the negative active material contains material capable of occluding and releasing lithium as an accessory ingredient. As for the material capable of occluding and releasing lithium, it is possible to use the mixture of carbon material, Li metal, Si, Sn, Al, SiO, SnO, or the like.

The negative active material is formed on a current collector with a conductive agent and a binder. As for the conductive agent, it is possible to use powders of conductive oxide in addition to the carbon material. As for the binder, poly-vinilydene fluoride can be used. As for the current collector, a metallic thin film with Cu as a main constituent can be used.

Next, there will be described operation of the lithium ion secondary battery of the present invention. By applying voltage to the positive electrode and to the negative electrode, the lithium ion emits from the positive active material, and the lithium ion is occluded in the negative active material, with the result the battery becomes a charged state. On the other hand, contrary to the charging time, when the positive electrode is brought into electrical contact with the negative electrode at an outer part of the battery, lithium ions are emitted from the negative active material and lithium ions are occluded in the positive active material, so that electrical discharge takes place.

There is no limitation in the shape of the battery of the present invention, accordingly, the positive electrode and the negative electrode, which are faced with each other while putting a separator therebetween, are capable of adopting a form such as a winding type, a laminating type or the like, so that it is possible to use a coin type, a laminate pack, a square type cell, and a tubular type cell as being a cell.

Figure 1:
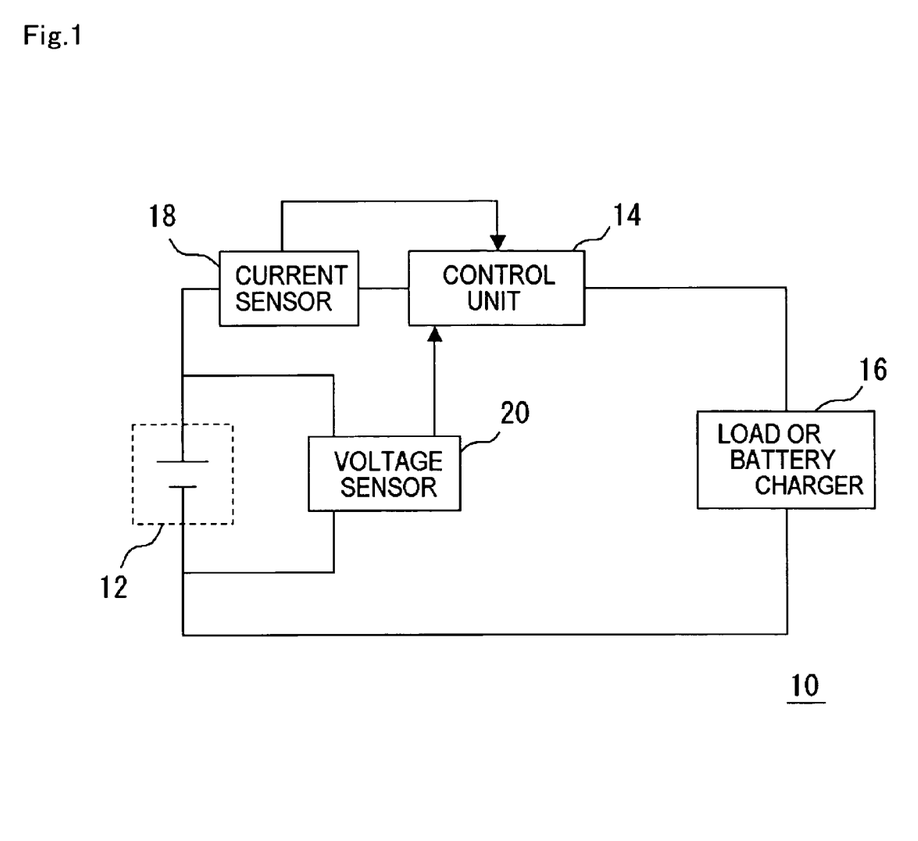
FIG. 1 is a block diagram showing an example of a lithium ion secondary battery system of the present invention.

FIG. 1 shows an example of the lithium ion secondary battery system in the embodiment of the present invention. The lithium ion secondary battery system 10 includes a lithium ion secondary battery 12, a control unit 14, a load (or a battery charger) 16, a current sensor 18 and a voltage sensor 20. The control unit 14 controls power feeding to the load (or the battery charger) 16 when the lithium ion secondary battery 12 is discharged or charged. The current sensor 18 measures a current value of the lithium ion secondary battery 12.

The voltage sensor 20 measures a voltage of the lithium ion secondary battery 12. The control unit 14 carries out an intermittent power feeding to the load (or the battery charger) 16 in the case where a current value, which is measured by the current sensor 18, is not less than a predetermined value. A means, by which the control unit 14 carries out the intermittent power feeding, is not particularly limited. It is possible to provide a known switch circuit or the like to carry out the power feeding to the load (or the battery charger) 16 when the current value is not less than a predetermined value. In addition, the control unit 14 may calculate the discharge rate or the charge rate of the lithium ion secondary battery 12 based on the current value measured by the current sensor 18; and may carry out the intermittent power feeding to the load (or the battery charger) 16, when the discharge rate or the charge rate is not less than a predetermined value.

Figure 2:
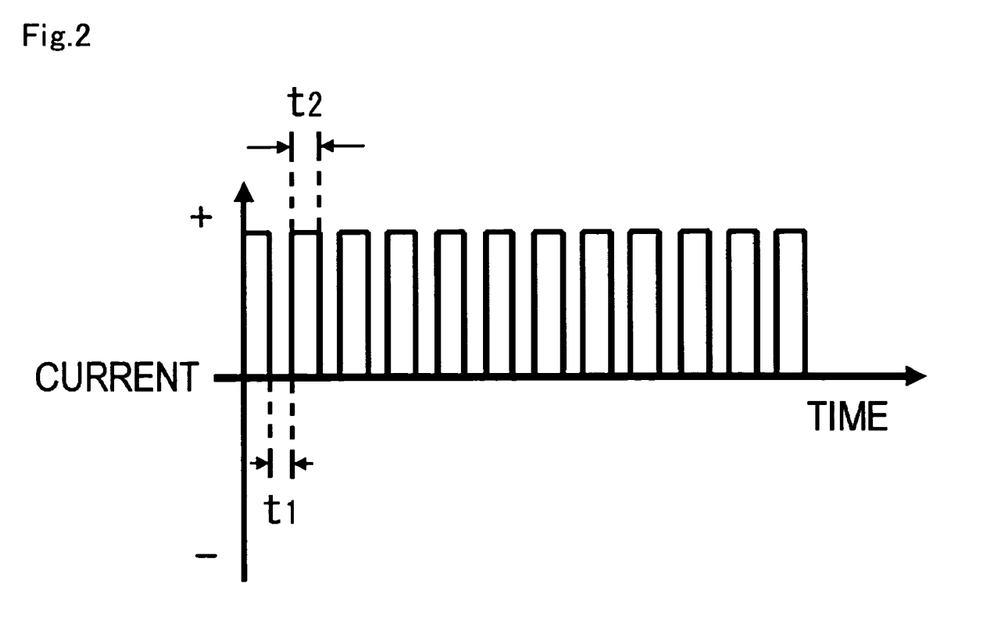
FIG. 2 is a view showing a current pattern controlled by a control unit.

FIG. 2 shows an intermittent current pattern controlled by the control unit 14. In such a way as above, the control unit 14 controls the lithium ion battery 12 to carry out the discharge or the charge while repeatedly executing a power feeding of a predetermined time $t_2$ and a pause of a predetermined time $t_1$.

FIG. 3(a) is a view showing a recovery state of the voltage when the discharge is made with the discharge rate of 20C until the voltage reaches the end voltage (2.5V) and then terminated. FIG. 3(a) shows a rate of recovery (%), and FIG. 3(b) shows a recovery voltage value (V). As shown, at the time after approximately 0.001 sec after the termination, the voltage is restored up to not less than approximately 70% of the open circuit voltage (4.1V). Here, although the recovery state of the voltage when the discharge is made with the discharge rate of 20 C is shown, the similar recovery state is shown when the discharge is made with the discharge rate of 5 C or 10 C. Although the pause time is not particularly limited, it is possible to be, for instance, not less than 0.001 sec to not more than 10 sec.

Also, when charging the lithium ion secondary battery 12 (see FIG. 1), the pause time is not particularly limited, and it is possible to set the pause time to the same degree of time as the pause time of the discharging time. In addition, at the charging time, the control unit 14 may refer to the voltage of the lithium ion secondary battery 12 measured by the voltage sensor 20 and terminate the power feeding until the voltage becomes value not more than the open circuit voltage when the voltage is larger than the open circuit voltage of the lithium ion secondary battery 12.

Figure 4:
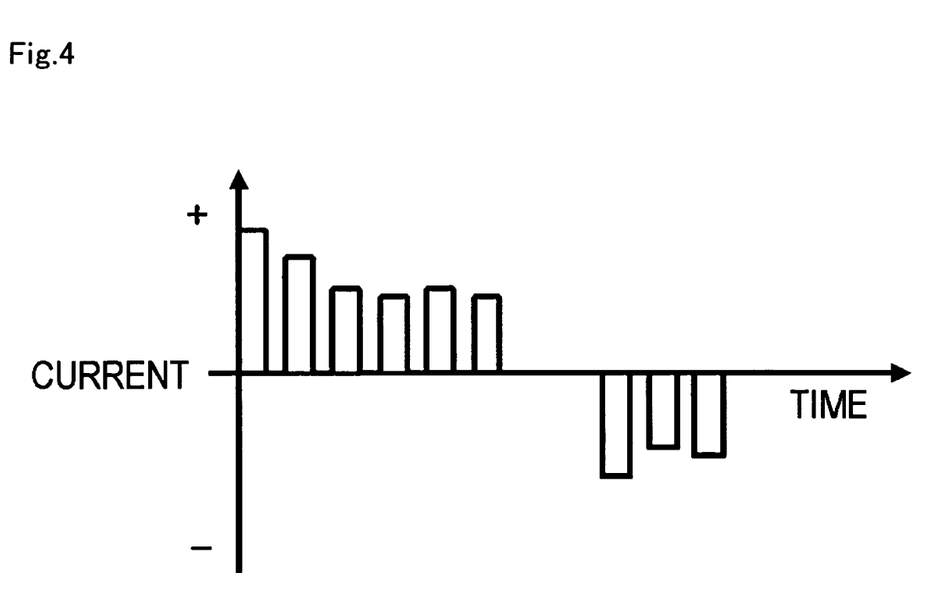
FIG. 4 is a view showing a current pattern controlled with the control unit.

Although FIG. 2 shows an example where the discharge is carried out with the current value (the discharge rate or the charge rate) set to a constant value, the control unit 14 may carry out the intermittent discharge when the current value is varied as shown in FIG. 4.

EMBODIMENT EXAMPLE

Embodiment Example 1

Here, the lithium ion secondary battery was manufactured with positive electrode materials of 4V class.

First, the negative electrode body was formed in such a way as to apply amorphous carbons to both faces of a copper foil sheet (thickness approximately 15 μm) with a thickness of approximately 50 μm while using the amorphous carbon as the negative active material. It should be noted that, as for the amorphous carbon, Carbotron P (registered trademark) produced by KUREHA CHEMICAL INDUSTRY CO. LTD was used. As for the positive active material, lithium-manganese composite oxides were used; and the positive electrode body was formed in such a way as to apply the lithium-manganese composite oxides to both faces of an aluminum foil sheet (thickness approximately 20 μm) with a thickness of approximately 70 μm. Next, the negative electrode body and the positive electrode body were placed to face each other in such a way that there was no electrical contact between the negative electrode body and the positive electrode body, with a laminated type separator (thickness approximately 25 μm) of a polyethylene film and a polypropylene film placed therebetween. After that, a nickel negative electrode terminal (thickness approximately 100 μm) and an aluminum positive electrode terminal (thickness approximately 100 μm) were attached to the electrode current collectors (uncoated part) of the negative electrode body and the positive electrode body respectively by ultrasonic welding. Successively, the above formed structure was wrapped with a laminated film (thickness approximately 100 μm) of an aluminum foil, and an electrolyte, which was prepared by dissolving lithium phosphate hexafluoride in nonaqueous solvent of propylene carbonate and methyl ethyl carbonate, was injected therein. Then, the structure was thermally fused and sealed under a reduced pressure resulting in a lithium ion secondary battery.

With the lithium ion secondary battery (nominal capacity 2 Ah) prepared as above, the intermittent discharging (repeated execution of 10 sec discharging and 0.8 sec pause) was carried out with the discharge rate as shown in below TABLE 1, and the discharge period up to the end voltage (2.5V) was measured to calculate the effective capacity in each case. The result thereof is shown in TABLE 1. In addition, in each discharge rate, similarly, the effective capacity was calculated in the case when the discharging was carried out continuously. In TABLE 1, the effective capacity magnification which was obtained by dividing the effective capacity of the intermittently discharge by the effective capacity of the continuous discharge is also shown.

TABLE 1

| DISCHARGE RATE | EFFECTIVE CAPACITY OF INTERMITTENT DISCHARGE (Ah) | EFFECTIVE CAPACITY OF CONTINUOUS DISCHARGE (Ah) | EFFECTIVE CAPACITY MAGNIFICATION |
|---|---|---|---|
| 1 C | 1.72 | 1.70 | 1.01 |
| 5 C | 1.69 | 1.59 | 1.06 |
| 10 C | 1.55 | 1.20 | 1.29 |
| 20 C | 0.98 | 0.29 | 3.38 |

As shown in TABLE 1, the effective capacity magnification, when the discharge rate is 1 C, is approximately 1.01, and there is little difference in the effective capacities of the intermittent discharge and the continuous discharge. However, it is shown that the effective capacity magnification increases as the discharge rate increases, by carrying out the intermittent discharge. Thus, according to the method for operating the lithium ion secondary battery system of the present invention, in particular, when the discharge rate is high, it is possible to improve the energy density per weight and the energy density per volume of the lithium ion secondary battery.

Embodiment Example 2

Similar to the embodiment example 1, the lithium ion secondary battery was manufactured. With the lithium ion secondary battery, the intermittent discharging (repeated execution of 1 sec discharging and 1 sec pause) and the continuous discharging were carried out, with the discharge rate of 25 C, and the dischargeable periods until the voltage reached the end voltage (2.5V) were measured. Then, the effective capacity in each case was calculated. The result thereof is shown in TABLE 2. In TABLE 2, the effective capacity magnification obtained by dividing the effective capacity of the intermittent discharge by the effective capacity of the continuous discharge is also shown.

TABLE 2

| DIS-CHARGE RATE | EFFECTIVE CAPACITY OF INTERMITTENT DISCHARGE (Ah) | EFFECTIVE CAPACITY OF CONTINUOUS DISCHARGE (Ah) | EFFECTIVE CAPACITY MAGNIFICATION |
|---|---|---|---|
| 25 C | 0.64 | 0.28 | 2.30 |

As shown above, it is shown that the effective capacity magnification increases by carrying out the intermittent discharging in the case where the discharge rate is set to 25 C. Thus, even though in the case where the discharge rate is high, it has been possible to reduce lowering of the effective capacity, by carrying out intermittent discharging, as well.

Embodiment Example 3

Here, a lithium ion secondary battery was manufactured with positive electrode materials of 5V class. The lithium ion secondary battery was obtained with the same producing method as the embodiment example 1, other than using $LiNi_{0.5}Mn_{1.5}O_4$ as the positive active material. With the lithium ion secondary battery manufactured as above, the intermittent discharging (repeated execution of 10 sec discharging and 0.8 sec pause), and the continuous discharging, both with the discharge rate of 20 C, were carried out, and the discharge periods until the voltage reached the end voltage (2.5V) were measured. Then, the effective capacity in each case was calculated. The result thereof is shown in TABLE 3. TABLE 3 also shows effective capacity magnification obtained by dividing the effective capacity of the intermittent discharge by the effective capacity of the continuous discharge.

TABLE 3

| DIS-CHARGE RATE | EFFECTIVE CAPACITY OF INTERMITTENT DISCHARGE (Ah) | EFFECTIVE CAPACITY OF CONTINUOUS DISCHARGE (Ah) | EFFECTIVE CAPACITY MAGNIFICATION |
|---|---|---|---|
| 20 C | 0.80 | 0.23 | 3.48 |

As shown in TABLE 3, it has been indicated that the effective capacity increases by carrying out the intermittent discharging in cases where the positive electrode material of 5V class is used when the discharge rate is high, as well.

Embodiment Example 4

Similar to the embodiment example 1, the lithium ion secondary battery was manufactured and the intermittent charging (repeated execution of 10 sec charging and 0.8 sec pause), and the continuous charging, both with the charge rate of 20 C, were carried out. The lithium ion secondary batteries charged as above were made to respectively discharge continuously with 1 C, and the discharge periods until the voltage reached the end voltage (2.5V) were measured.

Then, the effective capacity in each case was calculated. It has been shown in this case as well that the effective capacity increases more when the intermittent charging was carried out than when the continuous charging was carried out.

As above, there is described the present invention based on the embodiment and the embodiment example. This embodiment and embodiment example are only illustrations, consequently, various modified examples of the respective components or combinations of respective treatment processes are possible, also those modified examples fall within the scope of the present invention that is understood by person skilled in the art.

For instance, although it is described in the above embodiment example, that the intermittent discharge or charge is carried out with a pattern having a constant power feeding periods and pause periods, respectively, the pause period or the power feeding period may be respectively set to different time intervals.

As described above, according to the present invention, it is possible to reduce drop of the discharge or charge capacity when discharging or charging the lithium ion secondary battery with a large current, without changing design of the lithium ion secondary battery itself. Owing to this, since the effective capacity of the battery increases, it is possible to reduce amount of battery mounting, so that it is possible to expect weight reduction of a system, and cost reduction.

The invention claimed is:

1. A method for operating a lithium ion secondary battery system comprising:
   carrying out an intermittent power feeding in which a power feeding and a pause are repeatedly executed, when a lithium ion secondary battery is discharged with not less than a predetermined discharge rate to a discharge end voltage,
   wherein said pause is executed for a period not less than the period required for the voltage of the lithium ion secondary battery to restore up to not less than 70% of an open circuit voltage after the lithium ion secondary battery is discharged until the voltage thereof reaches the discharge end voltage, when the lithium ion secondary battery is discharged.

2. The method for operating the lithium ion secondary battery system as set forth in claim 1, wherein an intermittent power feeding in which a power feeding and a pause are repeatedly executed, when a lithium ion secondary battery is charged with not less than a predetermined charge rate, wherein said pause is executed for a period not less than the period required for the voltage of the lithium ion secondary battery to go down by not less than 70% of a voltage difference between the open circuit voltage and the charge end voltage after the lithium secondary battery is charged until the voltage thereof reaches the charge end voltage, when the lithium ion secondary battery is charged.

3. The method for operating the lithium ion secondary battery system as set forth in claim 1, wherein said intermittent power feeding is carried out when the discharge rate is not less than 5 C.

4. The method for operating the lithium ion secondary battery system as set forth in claim 1, wherein the lithium ion secondary battery includes a positive active material having an average discharge potential to the lithium metal of not less than 4.5V.

5. The method for operating the lithium ion secondary battery system as set forth in claim 1, wherein the lithium ion secondary battery is incorporated in a power supply device of an electric automobile or a hybrid automobile.

6. The method for operating the lithium ion secondary battery as set forth in claim 1, wherein an intermittent power feeding in which a power feeding and a pause are repeatedly executed, when a lithium ion secondary battery is charged with not less than a predetermined charge rate.

7. The method for operating the lithium ion secondary battery as set forth in claim 6, wherein said intermittent power feeding is carried out when the charge rate is not less than 5 C.

8. A lithium ion secondary battery system comprising:
a lithium ion secondary battery; and
a control unit which carries out an intermittent power feeding in which a power feeding and a pause are repeatedly executed, when a lithium ion secondary battery is discharged with not less than a predetermined discharge rate to a discharge end voltage, and
wherein said control unit executes said pause for a period not less than the period required for the voltage of the lithium ion secondary battery to restore up to not less than 70% of an open circuit voltage.

9. The lithium ion secondary battery system as set forth in claim 8, wherein said control unit executes said pause after the lithium ion secondary battery is discharged until the voltage thereof reaches the discharge end voltage, when the lithium ion secondary battery is discharged.

10. The lithium ion secondary battery system as set forth in claim 8, further comprising a voltage measuring unit which measures a voltage of the lithium ion secondary battery, wherein an intermittent power feeding in which a power feeding and a pause are repeatedly executed, when a lithium ion secondary battery is charged with not less than a predetermined charge rate, wherein said control unit executes said pause for a period not less than the period required for the voltage of the lithium ion secondary battery go down by not less than 70% of a voltage difference between the open circuit voltage and the charge end voltage after the lithium secondary battery is charged until the voltage thereof reaches the charge end voltage, when the lithium ion secondary battery is charged.

11. The lithium ion secondary battery system as set forth in claim 8, further comprising a detection unit which detects the discharge rate of the lithium ion secondary battery, wherein said control unit carries out said intermittent power feeding when the discharge rate of the lithium ion secondary battery is not less than 5 C.

12. The lithium ion secondary battery system as set forth in claim 8, wherein the lithium ion secondary battery includes a positive active material having an average discharge potential to the lithium metal of not less than 4.5V.

13. The lithium ion secondary battery as set forth in claim 8, wherein the lithium ion secondary battery is incorporated in a power supply device of an electric automobile or a hybrid automobile.

14. The lithium ion secondary battery system as set forth in claim 8, further comprising a detection unit which detects the charge rate of the lithium ion secondary battery, wherein said control unit carries out an intermittent power feeding in which a power feeding and a pause are repeatedly executed, when a lithium ion secondary battery is charged with not less than a predetermined charge rate.

15. The lithium ion secondary battery system as set forth in claim 14, further comprising a detection unit which detects the charge rate of the lithium ion secondary battery, wherein said control unit carries out said intermittent power feeding when the charge rate of the lithium ion secondary battery is not less than 5 C.

16. A method of operating a lithium ion secondary battery system comprising:
intermittently supplying power from the battery by repeatedly alternating a period of supplying power and a period of pausing the supplying of power when the battery is discharged at a rate equal to or greater than a predetermined discharge rate to a discharge end voltage,
wherein the period of pausing the supplying of power is equal to or greater than the period required for the battery voltage to restore to at least 70% of an open circuit battery voltage after the lithium ion secondary battery is discharged until the voltage thereof reaches the discharge end voltage, when the lithium ion secondary battery is discharged.

17. The method as set forth in claim 16, wherein power is intermittently supplied to the battery by repeatedly alternating a period of supplying power and a period of pausing the supplying of power when the battery is charged at a rate equal to or greater than a predetermined charge rate,
wherein the period of pausing the supplying of power is equal to or greater than the period required for the battery voltage to go down by at least 70% of a voltage difference between the open circuit voltage of the battery and a charge end voltage of the battery.

18. The method as set forth in claim 16, wherein the predetermined discharge rate is equal to or greater than five time the nominal capacity of the battery.

* * * * *